United States Patent
Carlson et al.

(10) Patent No.: US 11,662,794 B2
(45) Date of Patent: May 30, 2023

(54) USING A PREDICTED WORKLOAD TO IMPROVE PREPAREDNESS OF BACKUP POWER SOURCE

(71) Applicant: Lenovo (United States) Inc., Morrisville, NC (US)

(72) Inventors: Jeremy Robert Carlson, Raleigh, NC (US); Philip John Jakes, Durham, NC (US); Charles C. Queen, Morrisville, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/478,573

(22) Filed: Sep. 17, 2021

(65) Prior Publication Data

US 2023/0091486 A1 Mar. 23, 2023

(51) Int. Cl.
*G06F 1/30* (2006.01)
*G06F 1/3212* (2019.01)

(52) U.S. Cl.
CPC .............. *G06F 1/30* (2013.01); *G06F 1/3212* (2013.01)

(58) Field of Classification Search
CPC ................................ G06F 1/30; G06F 1/3212
USPC ........................................................ 713/300
See application file for complete search history.

(56) References Cited

U.S. PATENT DOCUMENTS

| | | | | |
|---|---|---|---|---|
| 4,400,624 A | * | 8/1983 | Ebert, Jr. | H02J 9/062 307/66 |
| 4,475,047 A | * | 10/1984 | Ebert, Jr. | H02J 9/062 700/298 |
| 2010/0083008 A1 | * | 4/2010 | Jakes | H01M 10/4207 713/300 |
| 2014/0095915 A1 | * | 4/2014 | Hitchcock | G06F 1/1632 713/323 |
| 2015/0048797 A1 | * | 2/2015 | Song | G01R 31/382 320/134 |
| 2018/0113500 A1 | * | 4/2018 | Loeffler | G06F 11/327 |
| 2018/0254632 A1 | * | 9/2018 | Elbsat | G05B 19/042 |
| 2019/0267809 A1 | * | 8/2019 | Cho | H02J 9/062 |

FOREIGN PATENT DOCUMENTS

WO WO-2013125156 A1 * 8/2013 ............... H02J 1/10

* cited by examiner

*Primary Examiner* — Chun Cao
(74) *Attorney, Agent, or Firm* — Schwegman Lundberg & Woessner, P.A.

(57) ABSTRACT

An amount of power that is provided to a load is measured. The load is coupled to a battery backup unit (BBU) or an uninterruptable power supply (UPS). The amount of power is stored into a history of power draw for the load. The history of power draw is used to determine a time period or a situation when additional power is required by the load or reduced energy can be provided to the load. The charge of the BBU or the UPS is increased or reduced prior to the time period or the situation when the additional power is required by the load or the reduced energy can be provided to the load.

15 Claims, 2 Drawing Sheets

USING A PREDICTED WORKLOAD TO IMPROVE PREPAREDNESS OF BACKUP POWER SOURCE

TECHNICAL FIELD

Embodiments described herein generally relate to the preparedness of a backup power source, and in an embodiment, but not by way of limitation, using a predicted workload to improve the preparedness of a backup power source.

BACKGROUND

Existing battery backup units (BBU) or uninterruptable power supplies (UPS) operate unaware of their external environment. Even a "Smart UPS'" is focused on internal sensing and monitoring.

Certain BBUs, such as Li-ion BBUs, limit the charge in the BBU to 70-80% of maximum capacity to preserve the longevity of the BBU. This limitation leads to diminished backup capacity than would be possible if the BBU was charged to 100%. Also, for optimal battery health and lifespan, the BBU needs to be fully cycled, that is fully discharged, on a regular basis. This is usually handled by setting a regular schedule of when it is most likely to be convenient to fully drain and then recharge the BBU. Both these conditions mean that less than full energy of the battery pack may be available at the time of an outage, even if the risk of an outage may be higher than normal due to some external event, such as impending weather.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In an embodiment, a battery backup unit (BBU) and/or an uninterruptable power supply (UPS) has the ability to measure the power provided to the attached load and to keep a history of the power draw on the BBU/UPS. Based on the history of the power draw, the BBU/UPS determines when the attached load requires more or less power and the BBU/UPS reacts as needed. For example, if a prolonged period of more power is predicted, the BBU/UPS can be safely charged over its typical threshold so as to be able to provide maximum energy in case of an unexpected outage. Similarly, during times of lower energy needs, the BBU/UPS could use that window to perform a maintenance cycle. Because the power needed is lower, the BBU/UPS is still able to provide enough runtime if a power loss was to occur during most of the discharge cycle.

Figure 1:
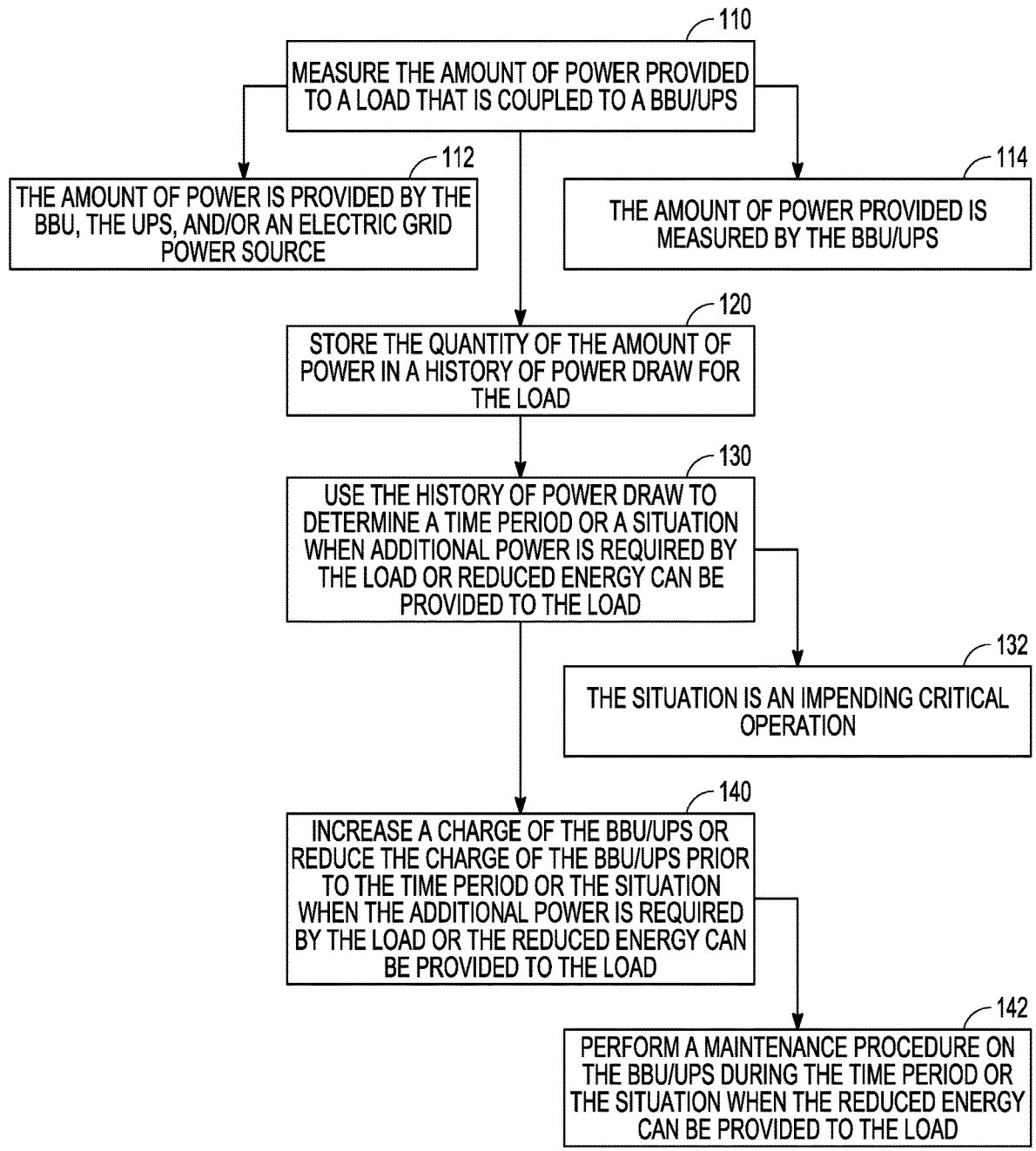
FIG. 1 illustrates a process to improve the preparedness of backup power sources based on a history of power draw of loads associated with the backup power sources.

FIG. 1 illustrates a process to improve the preparedness of backup power sources using a history of a power draw of one or more loads. FIG. 1 includes process, operation, and/or feature blocks 110-142. Though arranged substantially serially in the example of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 1, at 110, the amount of power that is provided to a load is measured. The load is coupled to a battery backup unit (BBU) and/or an uninterruptable power supply (UPS). In an embodiment, as indicated at 112, the amount of power provided to the load is provided by one or more of the BBU, the UPS, or an electric grid power source. In another embodiment, as indicated at 114, the amount of power provided to the load is measured by one or more of the BBU or the UPS.

At 120, the quantity of the amount of power, for example in kilowatts, is stored in a history of power draw for the load.

At 130, the history of power draw is used to determine a time period or a situation when additional power is required by the load or reduced energy can be provided to the load. A particular situation can be, for example, an impending critical operation (132) such as a key operation in a manufacturing process upon which many subsequent operations depend.

At 140, a charge of the BBU/UPS is increased or the charge of the BBU/UPS is reduced prior to the time period or the situation when the additional power is required by the load or the reduced energy can be provided to the load. Additionally, as indicated at 142, a maintenance procedure is performed on the BBU/UPS during the time period or the situation when the reduced energy can be provided to the load.

Figure 2:
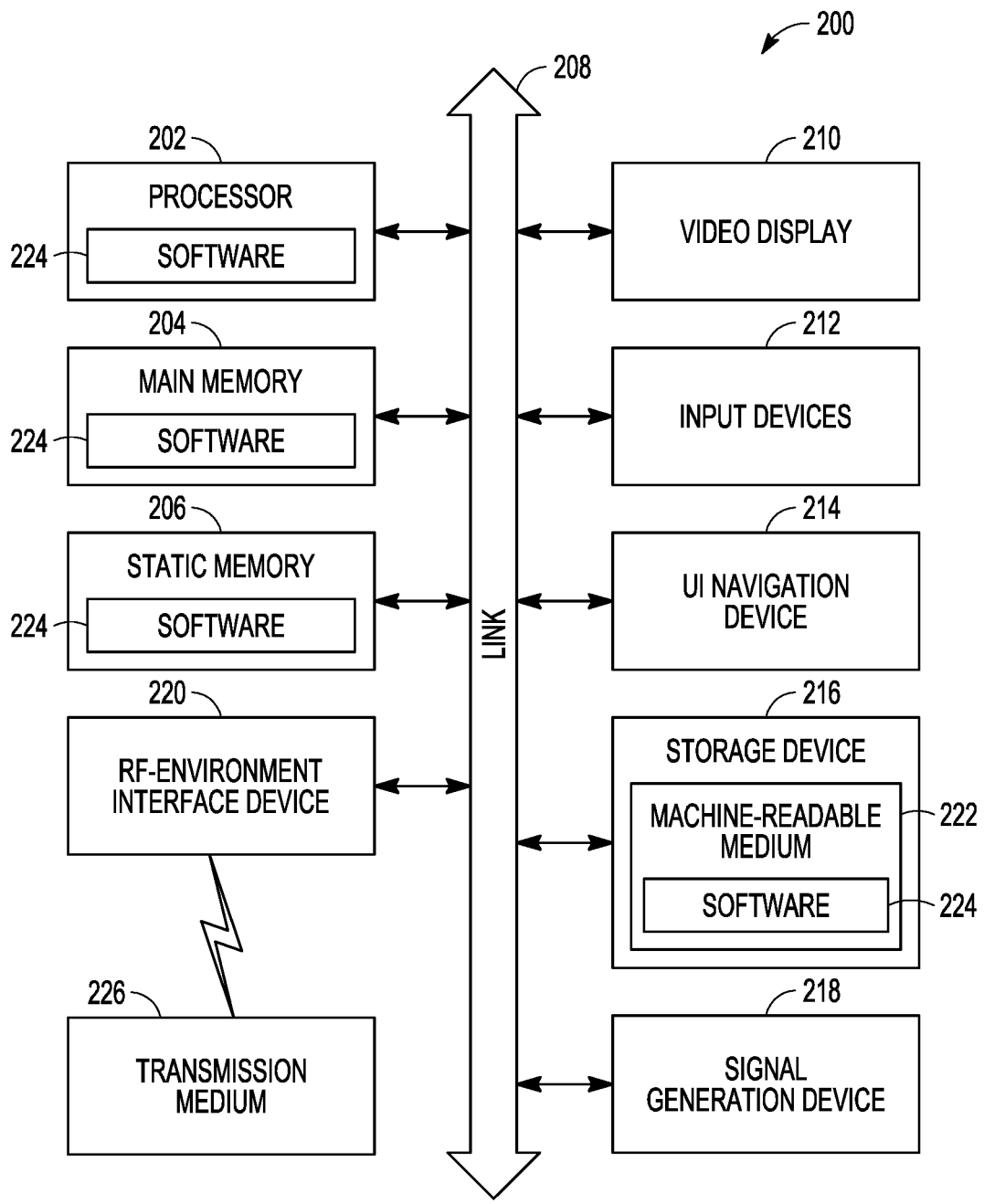
FIG. 2 is a block diagram of a computer architecture upon which one or more of embodiments disclosed herein can execute.

FIG. 2 is a block diagram illustrating a computing and communications platform 200 in the example form of a general-purpose machine on which some or all the operations of FIG. 1 may be carried out according to various embodiments. In certain embodiments, programming of the computing platform 200 according to one or more particular algorithms produces a special-purpose machine upon execution of that programming. In a networked deployment, the computing platform 200 may operate in the capacity of either a server or a client machine in server-client network environments, or it may act as a peer machine in peer-to-peer (or distributed) network environments.

Example computing platform 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computing platform 200 may further include a video display unit 210, input devices 212 (e.g., a keyboard, camera, microphone), and a user interface (UI) navigation device 214 (e.g., mouse, touchscreen). The computing platform 200 may additionally include a storage device 216 (e.g., a drive unit), a signal generation device 218 (e.g., a speaker), and a RF-environment interface device (RFEID) 220.

The storage device 216 includes a non-transitory machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computing platform 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 220 includes radio receiver circuitry, along with analog-to-digital conversion circuitry, and interface circuitry to communicate via link 208 according to various embodiments. Various form factors are contemplated for RFEID 220. For instance, RFEID may be in the form of a wideband radio receiver, or scanning radio receiver, that interfaces with processor 202 via link 208. In one example, link 208 includes a PCI Express (PCIe) bus, including a slot into which the NIC form-factor may removably engage. In another embodiment, RFEID 220 includes circuitry laid out on a motherboard together with local link circuitry, processor interface circuitry, other input/output circuitry, memory circuitry, storage device and peripheral controller circuitry, and the like. In another embodiment, RFEID 220 is a peripheral that interfaces with link 208 via a peripheral input/output port such as a universal serial bus (USB) port. RFEID 220 receives RF emissions over wireless transmission medium 226. RFEID 220 may be constructed to receive RADAR signaling, radio communications signaling, unintentional emissions, or some combination of such emissions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
  measuring an amount of power provided to a load, the load configured for coupling to a battery backup unit (BBU) or an uninterruptable power supply (UPS);
  storing the amount of power into a history of power draw for the load;
  using the history of power draw to determine a time period or a situation when additional power is required by the load or reduced energy can be provided to the load;
  increasing a charge of the BBU or the UPS or reducing the charge of the BBU or the UPS prior to the time period or the situation when the additional power is required by the load or the reduced energy can be provided to the load; and
  performing a maintenance procedure on the BBU or the UPS during the time period or the situation when the reduced energy can be provided to the load.

2. The process of claim 1, wherein the amount of power provided to the load is provided by one or more of the BBU, the UPS, or an electric grid power source.

3. The process of claim 1, wherein the amount of power provided to the load is measured by one or more of the BBU or the UPS.

4. The process of claim 1, wherein the situation comprises an impending critical operation.

5. The process of claim 1, wherein the load is coupled to the BBU or the UPS.

6. A non-transitory machine-readable medium comprising instructions that when executed by a processor executes a process comprising:
- measuring an amount of power provided to a load, the load configured for coupling to a battery backup unit (BBU) or an uninterruptable power supply (UPS);
- storing the amount of power into a history of power draw for the load;
- using the history of power draw to determine a time period or a situation when additional power is required by the load or reduced energy can be provided to the load;
- increasing a charge of the BBU or the UPS or reducing the charge of the BBU or the UPS prior to the time period or the situation when the additional power is required by the load or the reduced energy can be provided to the load; and
- performing a maintenance procedure on the BBU or the UPS during the time period or the situation when the reduced energy can be provided to the load.

7. The non-transitory machine-readable medium of claim 6, wherein the amount of power provided to the load is provided by one or more of the BBU, the UPS, or an electric grid power source.

8. The non-transitory machine-readable medium of claim 6, wherein the amount of power provided to the load is measured by one or more of the BBU or the UPS.

9. The non-transitory machine-readable medium of claim 6, wherein the situation comprises an impending critical operation.

10. The non-transitory machine-readable medium of claim 6, wherein the load is coupled to the BBU or the UPS.

11. A system comprising:
- a computer processor;
- a computer memory coupled to the computer processor;
- a load coupled to the computer processor; and
- a battery backup unit (BBU) or an uninterrupted power supply (UPS) coupled to the load;
- wherein the system is operable for:
  - measuring an amount of power provided to a load, the load configured for coupling to a battery backup unit (BBU) or an uninterruptable power supply (UPS);
  - storing the amount of power into a history of power draw for the load;
  - using the history of power draw to determine a time period or a situation when additional power is required by the load or reduced energy can be provided to the load;
  - increasing a charge of the BBU or the UPS or reducing the charge of the BBU or the UPS prior to the time period or the situation when the additional power is required by the load or the reduced energy can be provided to the load; and
  - performing a maintenance procedure on the BBU or the UPS during the time period or the situation when the reduced energy can be provided to the load.

12. The system of claim 11, wherein the amount of power provided to the load is provided by one or more of the BBU, the UPS, or an electric grid power source.

13. The system of claim 11, wherein the amount of power provided to the load is measured by one or more of the BBU or the UPS.

14. The system of claim 11, wherein the situation comprises an impending critical operation.

15. The system of claim 11, wherein the load is coupled to the BBU or the UPS.

* * * * *